United States Patent
Miao

(10) Patent No.: US 11,589,417 B2
(45) Date of Patent: Feb. 21, 2023

(54) SIDELINK COMMUNICATION RANGE SIGNALING

(71) Applicant: Intel Corporation, Santa Clara, CA (US)

(72) Inventor: Honglei Miao, Munich (DE)

(73) Assignee: Intel Corporation, Santa Clara, CA (US)

(*) Notice: Subject to any disclaimer, the term of this patent is extended or adjusted under 35 U.S.C. 154(b) by 220 days.

(21) Appl. No.: 16/909,692

(22) Filed: Jun. 23, 2020

(65) Prior Publication Data

US 2020/0323023 A1 Oct. 8, 2020

Related U.S. Application Data

(60) Provisional application No. 62/875,316, filed on Jul. 17, 2019.

(51) Int. Cl.
  *H04W 76/40* (2018.01)
  *H04W 4/40* (2018.01)
  *H04W 28/04* (2009.01)
  *H04W 92/18* (2009.01)

(52) U.S. Cl.
  CPC ............ *H04W 76/40* (2018.02); *H04W 4/40* (2018.02); *H04W 28/04* (2013.01); *H04W 92/18* (2013.01)

(58) Field of Classification Search
  CPC ..... H04W 76/40; H04W 28/04; H04W 92/18; H04W 4/46; H04W 4/40; H04W 76/27; H04W 4/80; H04W 4/023; H04W 72/044; H04W 74/0833; H04L 5/0055; H04L 1/1812; H04L 1/1896
  See application file for complete search history.

(56) References Cited

U.S. PATENT DOCUMENTS 11,088,806 B2 * 8/2021 Seo .................... H04L 1/1816
2020/0162864 A1 * 5/2020 Lee .................... H04W 28/02
2020/0412494 A1 * 12/2020 Wu .................... H04L 1/1812

(Continued)

OTHER PUBLICATIONS

"3GPP TS 38.331 V15.6.0", 3rd Generation Partnership Project;Technical Specification Group Radio Access Network;NR;Radio Resource Control (RRC) protocol specification(Release 15), (Jun. 2019), 519 pgs.

(Continued)

*Primary Examiner* — Awet Haile
(74) *Attorney, Agent, or Firm* — Schwegman Lundberg & Woessner, P.A.

(57) ABSTRACT

Systems and methods are described for indicating a range for which HARQ feedback is to be transmitted for sidelink V2X communications. A TX UE receives from a gNB an RRC message with an IE that describes a communication range. The communication range is used by a RX UE when the TX UE transmits a groupcast PSSCH and PSCCH to the RX UE to determine whether or not to send HARQ feedback in response to the TX UE transmission. The RX UE receives the communication range from the gNB or the TX UE signals the communication range in the SCI of the PSCCH. If the TX UE sends a TB in which multiple DRBs with different communication ranges are used for the PDU, the SCI indicates that either the maximum or minimum communication range is to be used.

20 Claims, 6 Drawing Sheets

(56) References Cited

U.S. PATENT DOCUMENTS

2021/0250118 A1\* 8/2021 Roth-Mandutz ...... H04W 72/10
2022/0191725 A1\* 6/2022 Ashraf .................. H04L 1/1854

OTHER PUBLICATIONS

"3GPP TS 38.321 V15.6.0", 3rd Generation Partnership Project;Technical Specification Group Radio Access Network;NR;Medium Access Control (MAC) protocol specification(Release 15), (Jun. 2019), 41 pgs.

"3GPP TSG RAN WG1 Meeting #97 RAN1 Chairman's Notes", (May 2019), 93 pgs.

\* cited by examiner

FIG. 3

SIDELINK COMMUNICATION RANGE SIGNALING

PRIORITY CLAIM

This application claims the benefit of priority to U.S. Provisional Patent Application Ser. No. 62/875,316, filed Jul. 17, 2019, which is incorporated herein by reference in its entirety.

TECHNICAL FIELD

Aspects pertain to wireless communications. Some aspects relate to wireless networks including Third Generation Partnership Project (3GPP) Long Term Evolution (LTE) networks, 3GPP LTE Advanced (LTE-A) networks, fourth-generation (4G) and fifth-generation (5G) networks including 5G new radio (NR) (or 5G-NR) networks. Other aspects are directed to systems and methods for sidelink resource allocation and user equipment (UE) processing behaviors for NR sidelink communications, in particular Hybrid Automatic Repeat Request (HARQ) in sidelink communications.

BACKGROUND

The use of 3GPP networks has increased due to both an increase in the types of devices user equipment (UEs) using network resources as well as the amount of data and bandwidth being used by various applications, such as video streaming, operating on these UEs. The 5G network, which like previous generations of networks includes both a radio-access network (RAN) and a core network (CN), has been developed to answer the enormous increase in number and diversity of communication devices, and are expected to increase throughput, coverage, and robustness and reduce latency and operational and capital expenditures. In addition to communication with the RAN, UE communications may include direct (sidelink) communications between the UE and other, non-RAN entities. Sidelink (SL) communications may involve their own challenges, including resource allocation for various types of communications.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3 illustrates a Medium Access Control (MAC) control element (CE) in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
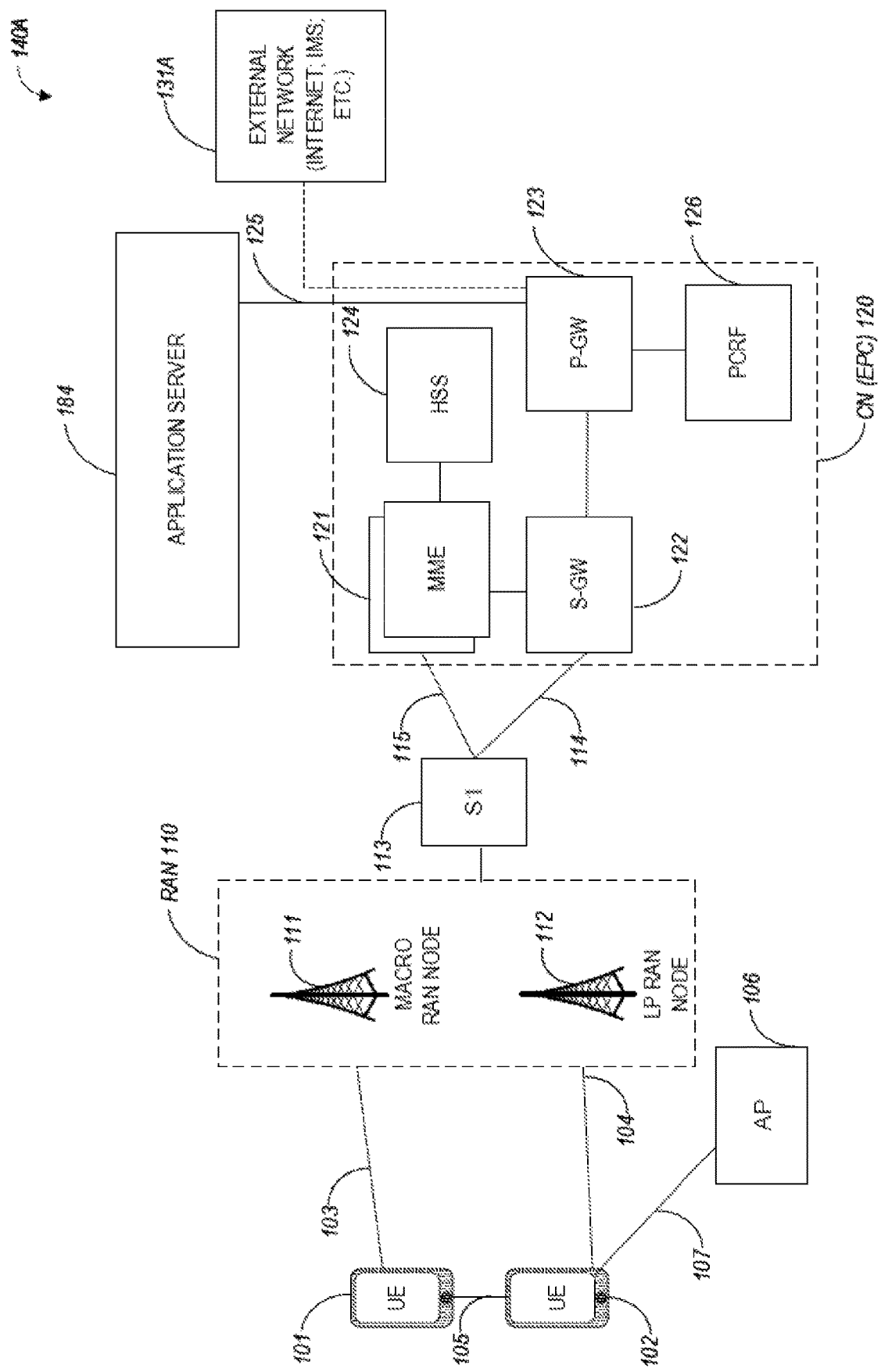
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
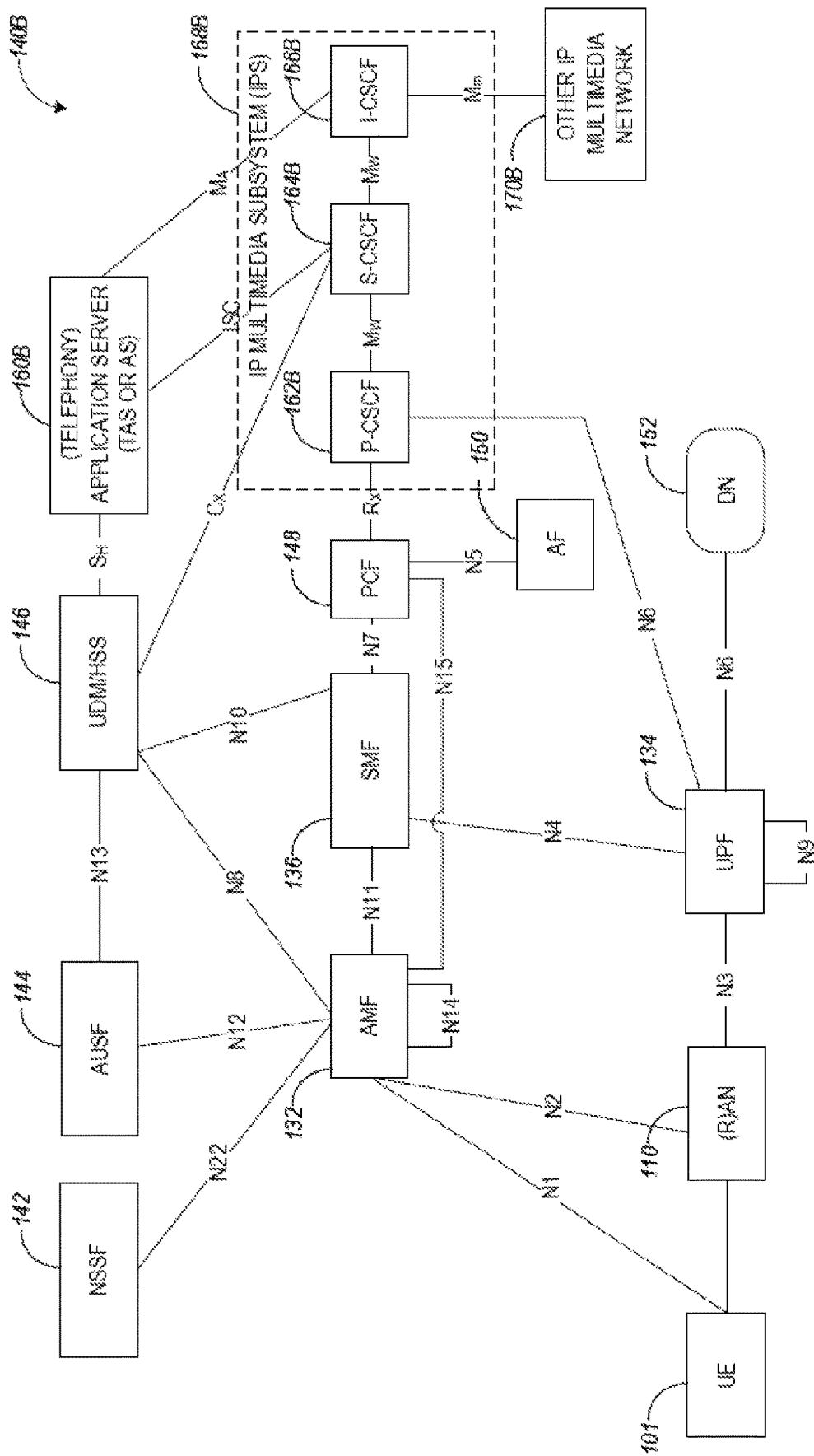
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
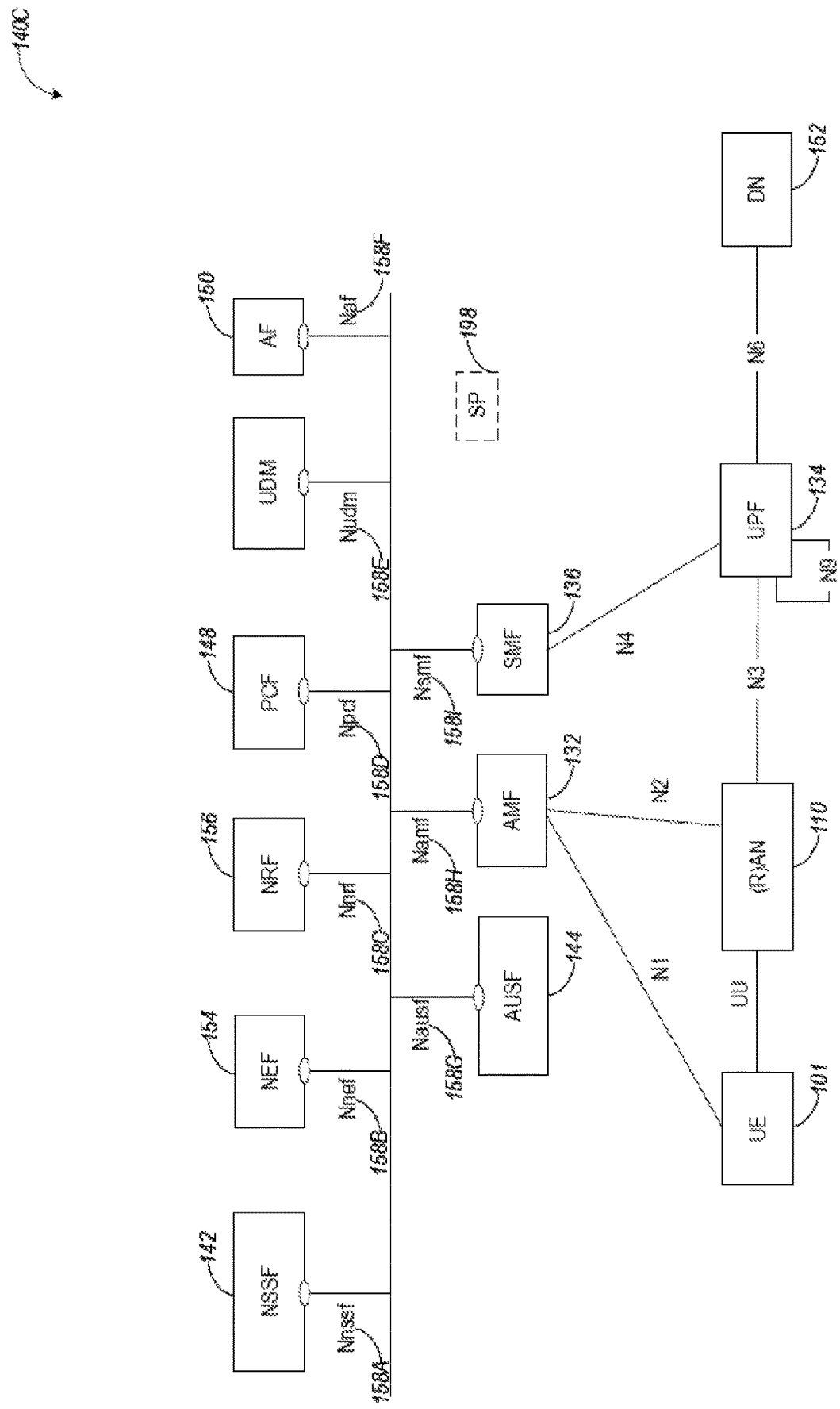
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
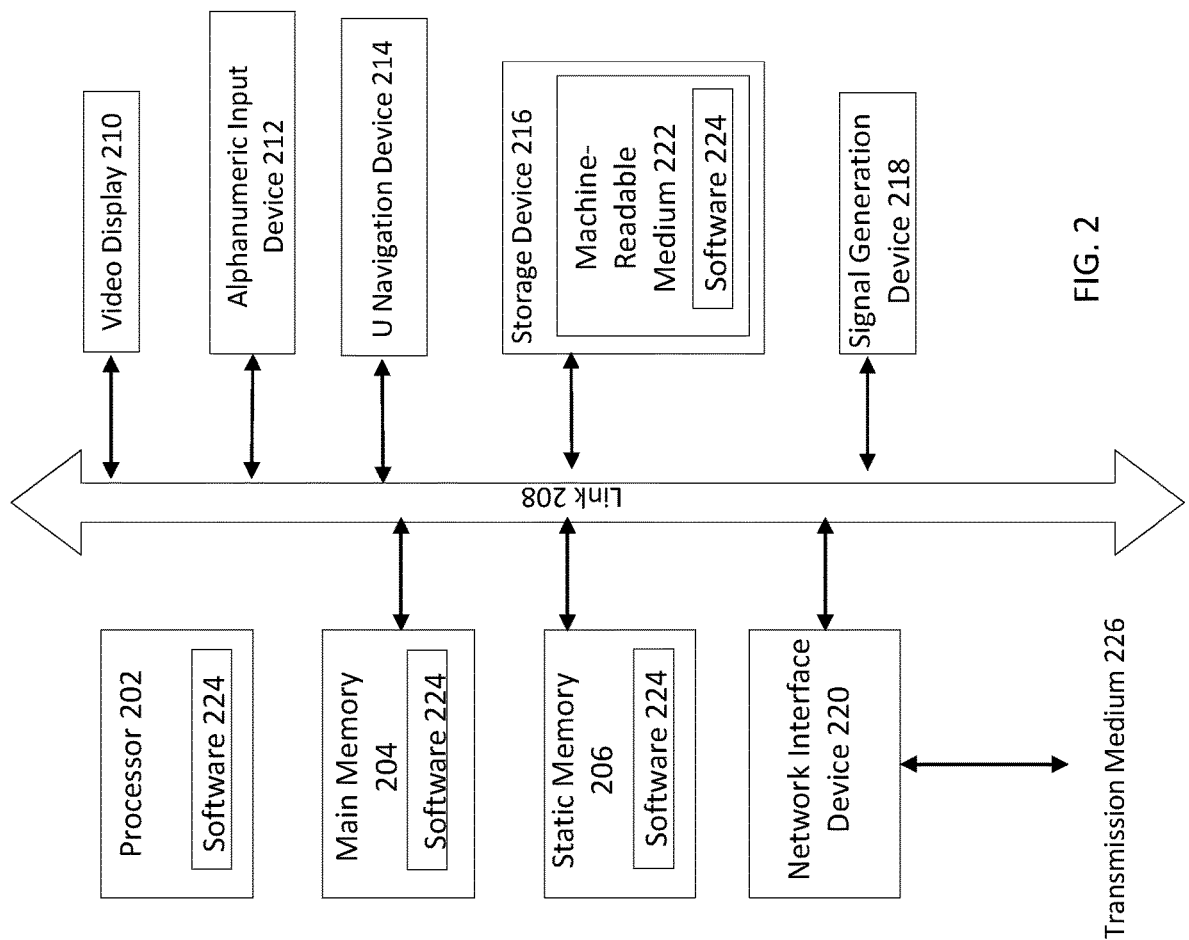
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

As above, UEs may engage in sidelink communications. One such type of sidelink communications includes vehicle-to-anything (V2X) communications using, for example, resources provided by a base station. V2X communications may be part of a next generation Intelligent Transportation System (ITS) that is to be designed to take into account the massive influx of low-data, high-delay and low power transmissions. There may be multiple radio access technologies (RATs) available for communications by V2X UEs. V2X UEs (also called on-board units or OBUs) may be equipped with a range of multiple access technologies for V2X communications, using protocols such as Dedicated Short Range Communication (DSRC), LTE, and NR, each of which may be direct or network-mediated communication between OBUs. The DSRC suite of protocols is based on the IEEE 802.11 standards, adding modifications to the exchange of safety messages between vehicles and vehicles and roadside units (RSUs).

The types of communications in the ITS may include Vehicle-to-Vehicle (V2V) communications, Vehicle-to-Infrastructure (V2I) communications, Vehicle-to-Network (V2N) communications and Vehicle-to-Pedestrian (V2P) communications. The communications may occur over a PC5 reference point. V2X applications in the V2X UEs may communicate with other vehicle-based V2X applications (V2V communications), V2I communications may involve communications with an RSU and V2N communications may involve communications with an eNB (or E-UTRAN) to provide various V2X services. The communications among OBUs may be coordinated by a traffic management server.

V2I transmission may be provided between a vehicle and UE (RSU). V2N transmission may be between a vehicle and a V2X application server. A V2X Application Server may be able to support multiple V2X applications. An RSU may be used to extend the range of a V2X message received from a vehicle by acting as a forwarding node (e.g., repeater). V2I may include communication between vehicles and traffic control devices, such as in the vicinity of road work. V2N may also include communication between vehicle and the server via the 4G/5G network, such as for traffic operations. Thus, an RSU may support V2I service that can transmit to, and receive from, a UE using V2I applications. In various embodiments, the RSU may be implemented in an eNB or a stationary UE. The RSU may rebroadcast V2X messages for other vehicles (V2V), pedestrians (V2P), or various networks systems (V2I) using a multimedia broadcast multicast service (MBMS) for LTE.

It is expected that NR-V2X communication systems will support a wide variety of use cases and deployment scenarios including basic safety message exchange, advanced driving applications, and extended sensor sharing. While basic safety applications may largely reuse the channel access LTE design that is based on sensing performed at the transmitter side, advanced applications may involve channel access schemes based on a combination of transmitter and receiver-based sensing to achieve higher data rates and reliability. Independent of the type of application, Hybrid Automatic Repeat reQuest (HARQ) feedback and HARQ combining in the physical layer may be used to improve the link performance of a sidelink communications. HARQ-ACK (Acknowledge) or HARQ-NACK (Non-Acknowledge) feedback for data transmitted in the Physical Sidelink Shared Channel (PSSCH) may be carried in the Sidelink Feedback Control Information (SFCI) format(s) via the Physical Sidelink Feedback Control Channel (PSFCH) in resource allocation modes 1 (network controlled allocation) and 2 (autonomous allocation) for sidelink unicast and groupcast communications.

Techniques discussed herein can be used for sidelink resource allocation schemes, in particular for HARQ-ACK communications. HARQ options may include NACK-only feedback (i.e., provide HARQ-ACK signaling only when a NACK is to be sent) and ACK/NACK feedback (i.e., provide HARQ-ACK signaling when either an ACK or a NACK is to be sent). NR sidelink communication may support both option 1) NACK-only feedback and option 2) ACK/NACK feedback.

For groupcast with option 1, it may be also possible that a V2X RX UE (i.e., a V2X receiver) decides not to send the HARQ feedback, even though transmission of the feedback may be (pre-)configured. The ability to avoid transmission of the HARQ feedback may be beneficial to reduce channel congestion. The criteria according to which the V2X RX UE can decide whether or not to transmit the HARQ feedback can be based on either Reference Signal Receive Power (RSRP) at the V2X RX UE and/or the distance between the TX UE and the RX UEs. Specifically, distance-based HARQ feedback can be a good option for scenarios where, for instance, UEs physically close to each other but blocked by blockers may have very short radio distance. However, such functionality may yield additional overhead since position-related information may be transmitted to the RX UE. Therefore, it may be beneficial to support both RSRP-based and distance-based HARQ feedback, which can be (pre-)configured. Furthermore, it may be possible that a network (pre-)configures a UE to use both RSRP-based and distance-based HARQ feedback, and the UE may only be allowed to skip HARQ feedback transmission when both criteria are not met.

For at least option 1, e.g., TX-RX distance-based HARQ feedback for groupcast, a UE may transmit HARQ feedback for the PSSCH if the TX-RX distance is smaller or equal to the communication range parameter. Otherwise, the UE does not transmit HARQ feedback for the PSSCH. A TX UE's location may be indicated by SCI associated with the PSSCH. The manner in which the TX locations can be defined and signaled in SCI is indicated below, as well as the manner in which the TX-RX distance is estimated by the RX UE based on its own location and TX UE location. The communication range requirement used for a PSSCH may be known after decoding SCI associated with the PSSCH.

Whether and how the communication range requirement is implicitly or explicitly signaled may be one issue to resolve. Specifically, various methods may be used to signal the sidelink V2X communication range parameters, and can be used for different sidelink V2X resource/signaling configurations so that overall signaling overhead can be adapted according to the actual scenarios.

Different methods are described herein to signal the SL V2X communication range parameters for a transmitted SCI scheduling groupcast PSSCH to enable the V2X RX UE to be aware of the communication range requirement associated with the received groupcast PSCCH/PSSCH.

Method 1 may include the use of a radio bearer-specific sidelink communication range requirement configuration. In this method, a new radio resource control (RRC) parameter can be (pre)configured to a SL V2X data radio bearer (DRB) to indicate the communication range requirement of the associated DRB. The RRC IE may be provided in an RRC Connection Reconfiguration message, for example, to which the UE may respond with a RRC Connection Reconfiguration Complete message. The RRC parameter may be the SL-V2X-CommunicationRangeReqConfig parameter and the SL V2X data radio bearer (DRB) may be SL-V2X-DRB-ToAddMod. As a result, each SL V2X DRB can be configured with RB-specific communication range parameter. In some aspects, different DRBs associated with different V2X services or quality of service (QoS) flows can be configured with different communication range parameters.

For example, a groupcast SL V2X service to multiple V2X RX UEs can have a larger communication range requirement than that for unicast SL V2X service aiming at a single V2X RX UE. Specifically, the following RRC information elements (IE)s can be used to realize this function.

SL-V2X-CommRangeReqIndex::=INTEGER (1 . . . maxNrofCommRangeReqConfigs)

where the RRC IE type SL-V2X-CommRangeReqIndex may define the type of the index of supported different SL V2X communication range parameter. The parameter maxNrofCommRangeReqConfigs may define the maximum number of supported different SL V2X communication range parameters.

```
SL-V2X-CommRangeReqConfig ::=      SEQUENCE {
commRangeReqIndex SL-V2X-CommRangeReqIndex,
commRangeReq  ENUMERATED { m5, m10, m20, m50, m100, m200,
m500, spare1},
}
``` where the RRC IE SL-V2X-CommRangeReqConfig may define a supported configuration of SL V2X communication range parameter. The parameter commRangeReqIndex may define the index of the SL V2X communication requirement range configuration. The parameter commRangeReq may define the communication range requirement (e.g., in meters) of the SL V2X communication requirement range configuration.

```
SL-V2X-CommRangeReqConfigList ::=      SEQUENCE (SIZE (1..
maxNrofCommRangeReqConfigs)) OF
SL-V2X-CommRangeReqConfigIndex
``` where the RRC IE SL-V2X-CommRangeReqConfigList may define the set of supported configurations of SL V2X communication range requirement for the SL V2X UE.

```
SL-V2X-DRB-ToAddMod ::=      SEQUENCE {
    cnAssociation        CHOICE {
        eps-BearerIdentity   INTEGER (0..15), -- EPS-DRB-Setup
        sdap-Config   SDAP-Co   -- 5GC
    } OPTIONAL, -- CondDRBSetup
    drb-Identity  DRB-Identity,
    reestablishPDCP   ENUMERATED{true}   OPTIONAL,  -- Need N
    recoverPDCP   ENUMERATED{true}   OPTIONAL,  -- Need N
    pdcp-Config   PDCP-Config   OPTIONAL,  -- Cond PDCP
    commRangeReq  SL-V2X-CommRangeReqIndex OPTIONAL,
    ...
}
``` where the RRC IE SL-V2X-DRB-ToAddMod may define the SL V2X DRB to be configured for the SL V2X UE. This RRC IE may reuse at least some of the parameters of RRC IE DRB-ToAddMod in TS 38.331 v15.6.0 (2019-06-29). In addition, a new parameter commRangeReq may define the SL communication range requirement of the SL V2X DRB. The parameter commRangeReq may signal the index of the supported SL V2X communication range requirement configuration. The communication range requirement in terms of distance may be defined in the associated SL V2X communication range requirement configuration, which can be determined from the relevant QoS parameters of the SL V2X service/QoS flow.

Method 2 may include the use of explicit SCI signaling for communication range parameter. In this method, the SCI scheduling the groupcast PSSCH data can include a field that explicitly signals the communication range requirement associated with the transport block carried by the PSSCH. The field may be indicated as the comm-range-req field. Based on the received SCI, which includes the comm-range-req field, the SL V2X RX UE can decide if the scheduled PSSCH is to be further detected and/or HARQ-ACK feedback is to be transmitted in response to the received PSCCH. Specifically, the SCI field comm-range-req can signal the index of relevant SL-V2X-CommRangeReqConfig configured/activated in the SL-V2X-CommRangeReqConfigList of Method 1, above. Therefore, the size of the configured SL-V2X-CommRangeReqConfigList may determine the bit length of the SCI field comm-range-req.

When the transport block transmitted in the PSSCH includes a MAC PDU consisting of only one logical channel, the comm-range-req field can be set to the index of SL-V2X-CommRangeReqConfig corresponding to the commRangeReq in Method-1 associated with the DRB mapped to the logical channel carried in the MAC protocol data unit (PDU). The MAC PDU may, however, instead include multiple logical channels, each of which is mapped to different DRBs with different commRangeReq. In this case, different options can be used to determine the value of comm-range-req field: SCI signaling of the minimum (option 1) or maximum (option 2) communication range requirement among logical channels/DRBs multiplexed in the MAC PDU.

The SCI signaling of the minimum communication range requirement among logical channels/DRBs multiplexed in the MAC PDU can be useful to reduce potential UL HARQ transmission congestion as the minimum value of communication range requirements in the multiplexed DRBs is used so that a smaller number of V2X RX UEs would be able to be used to transmit the HARQ-ACK response to the scheduled groupcast PSSCH. The SCI signaling of the maximum communication range requirement among logical channels/DRBs multiplexed in the MAC PDU, on the other hand, can be useful to increase the reception robustness of delivered groupcast PSSCH message. This latter case can be useful in a scenario in which less traffic demand is present, and it is more desired that the groupcast message can be more reliably received by the target RX UEs. In this scenario, it would be beneficial for an increased number of RX UEs to be able to send the HARQ-ACK response to the groupcast PSSCH. Since the maximum value of communication range parameters in the multiplexed DRBs is used, a larger number of V2X RX UEs would consequently be able to transmit the HARQ-ACK response to the scheduled groupcast PSSCH.

Method 3 may include a MAC control element-based communication range requirement activation. A large number of different communication range requirement configurations can be configured in SL-V2X-CommRangeReqConfigList so that more diverse SL V2X communication range parameters with finer distance granularity can be (pre) configured in SL V2X UE. To reduce the signaling overhead of SCI signaling the comm-range-req field, whose bit length depends on the size of SL-V2X-CommRangeReqConfigList as in Method-2, in this method, a MAC CE may be used to activate/deactivate a subset of SL-V2X-CommRangeReqConfigs (i.e., fewer communication range requirements than in the set) configured in SL-V2X-CommRangeReqConfigsList so that only those activated SL-V2X-CommRangeReqConfigs are considered to be signaled in SCI comm-range-req field. As a result, the size of SCI field comm-range-req may depend on the number of activated SL-V2X-CommRangeReqConfigs by the MAC CE signaling.

Figure 3:
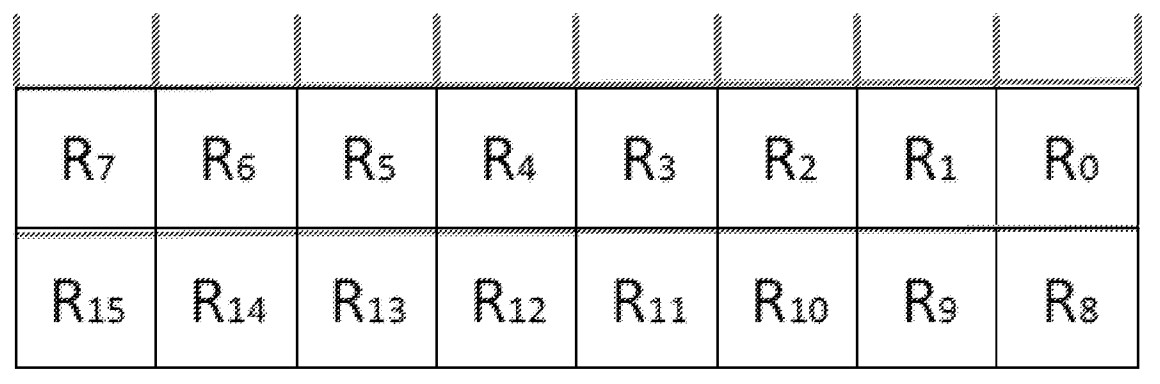

FIG. 3 illustrates a MAC CE in accordance with some embodiments. As shown in FIG. 3, an SL-V2X-CommRangeReqConfig Activation/Deactivation MAC CE of two octets can be identified by a MAC PDU subheader with a new Logical Channel ID (LCID) to be specified in TS 38.321 v15.6.0 (2019-06-29). The SL-V2X-CommRangeReqConfig Activation/Deactivation MAC CE may have a fixed size and consist of two octets containing 16 R-fields. The SL-V2X-CommRangeReqConfig Activation/Deactivation MAC CE may be defined, for a MAC entity, with $R_i$. $R_i$ may be a field that indicates the activation/deactivation status of the $i^{th}$ SL-V2X-CommRangeReqConfig in the SL-V2X-CommRangeReqConfigList. The $R_i$ field may, for example, be set to "1" to indicate that the $i^{th}$ SL-V2X-CommRangeReqConfig in the SL-V2X-CommRangeReqConfigList is to be activated, otherwise the $i^{th}$ SL-V2X-CommRangeReqConfig in the SL-V2X-CommRangeReqConfigList is to be deactivated. The $R_i$ field may be ignored if the SL-V2X-CommRangeReqConfigList does not include the $i^{th}$ entry.

Method 4 may include the use of a resource pool-specific communication range requirement configuration. In this method, each SL transmission resource pool for PSCCH and PSSCH can be (pre)configured with a resource pool specific communication range parameter. As a result, different resource pools may have different communication range parameters. When a SCI scheduling PSSCH is transmitted from a particular resource pool, the communication range requirement associated with the resource pool can be applied by the SL V2X RX UE.

In an aspect in which a resource pool is also (pre) configured with a set of communication range requirements, the SCI field comm-range-req. can be used to signal which particular communication range requirement among the set of communication range parameters configured with the resource pool is to be considered for the particular PSCCH/PSSCH transmission. As a result, the number of communication range parameters configured for a particular resource pool may determine the bit length of comm-range-req field in the SCI transmitted from the respective resource pool.

Figure 4:
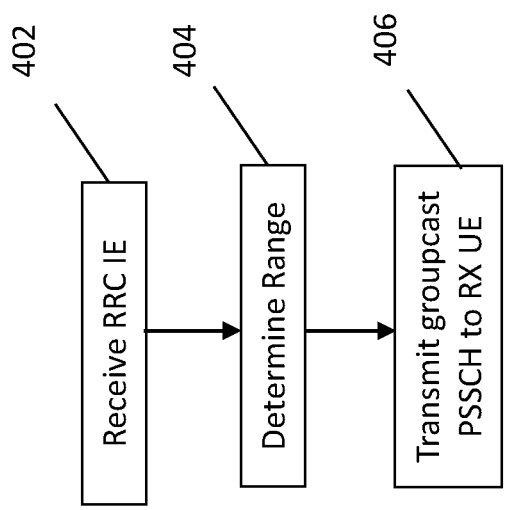
FIG. 4 illustrates a method of providing indicating a communication range to provide HARQ feedback in sidelink V2X communications in accordance with some embodiments.

FIG. 4 illustrates a method of providing indicating a communication range to provide HARQ feedback in sidelink V2X communications in accordance with some embodiments. The apparatus shown and described herein may be configured to perform one or more of the operations disclosed herein. FIG. 4 is merely exemplary; in other embodiments, other operations may be present.

At operation 402, the TX UE may receive an RRC message (e.g. RRC Connection Reconfiguration message) from the gNB. The RRC IE may have a number of different RRC IEs describing the communication range for the RX UE to transmit HARQ feedback to the TX UE for sidelink V2X communications. The RRC IE may provide a communication range configuration list of communication ranges. The RRC IE may indicate one or more DRBs, each DRB having an independent communication range.

At operation 404, after having received the RRC message, the TX UE or RX UE may determine the communication range for the HARQ feedback to use for a particular DRB. Alternatively, the communication range for a PDU of the PSSCH may be indicated by the TX UE to the RX UE in a SCI of a PSCCH associated with a PSSCH. If the PDU includes multiple DRBs, the SCI may indicate either the minimum or maximum communication range. In some embodiments, the communication range signaled by the SCI may be limited by a MAC CE, which activates/deactivates a subset of the communication range in the communication range configuration list. If a set of V2X resources is mapped to multiple communication ranges, the SCI may indicate which communication range is to be used.

At operation 406, the TX UE may transmit a groupcast PSSCH sidelink V2X communication to the RX UE. The TX UE and/or RX UE may determine the distance between the TX UE and RX UE may be determined and whether or not HARQ feedback is sent from the RX UE to the TX UE may be dependent on the distance and the communication range.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE) to configure the UE for New Radio (NR) vehicle-to-everything (V2X) sidelink communication, the apparatus comprising processing circuitry and a memory configured to:
   decode a radio resource control (RRC) message, the RRC message comprising a communication range configuration RRC information element (IE), the communication range configuration RRC IE comprising a communication range parameter for a data radio bearer (DRB) for sidelink vehicle-to-everything (V2X) communication, the communication range parameter indicating a distance between the UE and another UE;
   determine that data is to be transmitted on a groupcast physical sidelink shared channel (PSSCH);
   determine, based on the communication range parameter and Quality of Service parameters of a sidelink V2X service associated with the data, that the groupcast PSSCH is to use the DRB;
   generate the groupcast PSSCH on the DRB; and
   decode Hybrid Automatic Repeat reQuest (HARQ) feedback to the groupcast PSSCH if a distance between a receiving (RX) UE that has received the groupcast PSSCH and the UE is less than the distance indicated by the communication range parameter.

2. The apparatus of claim 1, wherein the RRC message is an RRC Connection Reconfiguration message that comprises a communication range parameter for each of a plurality of DRBs, including DRBs for groupcast and unicast sidelink V2X communications, the communication range parameter for the groupcast sidelink V2X communication being larger than for the unicast sidelink V2X communication.

3. The apparatus of claim 2, wherein the RRC Connection Reconfiguration message comprises a communication range index RRC IE comprising an index parameter indicates an index of each supported sidelink V2X communication range parameter up to a maximum number of supported sidelink V2X communication range parameters.

4. The apparatus of claim 3, wherein the communication range configuration RRC IE comprises the index of the sidelink V2X communication range parameter and a distance associated with the index.

5. The apparatus of claim 1, wherein the processing circuitry is further configured to:
   generate a Physical Sidelink Control Channel (PSCCH) comprising a Sidelink Control Information (SCI) associated with the groupcast PSSCH, the SCI comprising an SCI field that signals the communication range associated with a transport block carried by the groupcast PSSCH.

6. The apparatus of claim 5, wherein the SCI field comprises an index parameter that indicates an index of the sidelink V2X communication range parameter, the index received in the RRC message, which is an RRC Connection Reconfiguration message.

7. The apparatus of claim 5, wherein the processing circuitry is further configured to:
   decode, from a receiving (RX) UE in response to transmission of the groupcast PSSCH, the HARQ feedback on a Physical Sidelink Feedback Channel (PSFCH).

8. The apparatus of claim 5, wherein the transport block comprises a Medium Access Control (MAC) protocol data unit (PDU) associated with multiple logical channels, at least some of the logical channels mapped to different DRBs that have a different communication range parameter.

9. The apparatus of claim 8, wherein the SCI field signals a minimum communication range parameter among the communication range parameters associated with the different DRBs.

10. The apparatus of claim 8, wherein the SCI field signals a maximum communication range parameter among the communication range parameters associated with the different DRBs.

11. The apparatus of claim 5, wherein:
    the communication range configuration RRC IE comprises a set of different communication range parameters, and
    the transport block comprises a Medium Access Control (MAC) control element (CE) configured to activate a subset of the set of different communication range parameters to limit a size of the SCI field.

12. The apparatus of claim 11, wherein:
the MAC CE is a two octet field, each bit of which is associated with a different communication range parameter and specifies whether the associated communication range parameter is activated.

13. The apparatus of claim 5, wherein:
a resource pool used for transmission of the groupcast PSSCH and the PSCCH is preconfigured with a specific communication range parameter, and
the processing circuitry is configured to apply the communication resource parameter associated with the resource pool to transmit the groupcast PSSCH and the PSCCH.

14. The apparatus of claim 5, wherein:
a resource pool used for transmission of the groupcast PSSCH and the PSCCH is preconfigured with a set of communication range parameters, and
the processing circuitry is configured to apply one of the set of communication resource parameters associated with the resource pool to transmit the groupcast PSSCH and the PSCCH, the SCI field configured to indicate which of the set of communication resource parameters is used to transmit the groupcast PSSCH and the PSCCH.

15. The apparatus of claim 14, wherein a number of communication range parameters in the set of communication range parameters determines a bit length of the SCI field.

16. N apparatus of a New Radio (NR) NodeB (gNB), the apparatus comprising processing circuitry and a memory configured to:
encode, for transmission to a user equipment (UE), a radio resource control (RRC) message, the RRC message comprising a communication range configuration RRC information element (IE) and a communication range index IE, the communication range configuration RRC IE comprising a communication range configuration that comprises a communication range parameter and an index number, the communication range parameter indicating a distance between the UE and another UE with which the UE is to communicate using a data radio bearer (DRB) for vehicle-to-everything (V2X) sidelink communication, the distance limiting Hybrid Automatic Repeat reQuest (HARQ) feedback from the other UE by indicating that the other UE is to send the HARQ feedback if a distance between the UE and the other UE is less than the distance of the communication range parameter when the V2X sidelink communication is received from the UE, the communication range index IE comprising a maximum number from which the index number is selected; and decode, from the UE, another RRC message sent in response to reception of the RRC message.

17. The apparatus of claim 16, wherein the RRC message further comprises a communication list RRC IE that comprises a set of supported communication range configurations.

18. A non-transitory computer-readable storage medium that stores instructions for execution by a user equipment (UE) to configure the UE for New Radio (NR) vehicle-to-everything (V2X) sidelink communication, the instructions, when executed, configure one or more processors to:
decode a radio resource control (RRC) message, the RRC message comprising a communication range configuration RRC information element (IE), the communication range configuration RRC IE comprising a communication range parameter for a data radio bearer (DRB) for sidelink vehicle-to-everything (V2X) communication, the communication range parameter indicating a distance between the UE and another UE;
determine that data is to be transmitted on a groupcast physical sidelink shared channel (PSSCH);
determine, based on the communication range parameter and Quality of Service parameters of a sidelink V2X service associated with the data, that the groupcast PSSCH is to use the DRB;
generate the groupcast PSSCH on the DRB; and
decode Hybrid Automatic Repeat reQuest (HARQ) feedback to the groupcast PSSCH if a distance between a receiving (RX) UE that has received the groupcast PSSCH and the UE is less than the distance indicated by the communication range parameter.

19. The non-transitory computer-readable storage medium of claim 18, wherein the instructions, when executed, further configure one or more processors to generate a Physical Sidelink Control Channel (PSCCH) comprising a Sidelink Control Information (SCI) associated with the groupcast PSSCH, the SCI comprising an SCI field that signals the communication range associated with a transport block carried by the groupcast PSSCH.

20. He non-transitory computer-readable storage medium of claim 19, wherein:
a resource pool used for transmission of the groupcast PSSCH and the PSCCH is preconfigured with a set of communication range parameters, and
the instructions, when executed, further configure one or more processors to apply one of the set of communication resource parameters associated with the resource pool to transmit the groupcast PSSCH and the PSCCH, the SCI field configured to indicate which of the set of communication resource parameters is used to transmit the groupcast PSSCH and the PSCCH.

* * * * *

UNITED STATES PATENT AND TRADEMARK OFFICE
CERTIFICATE OF CORRECTION

PATENT NO. : 11,589,417 B2
APPLICATION NO. : 16/909692
DATED : February 21, 2023
INVENTOR(S) : Honglei Miao It is certified that error appears in the above-identified patent and that said Letters Patent is hereby corrected as shown below:

In the Claims

In Column 17, Line 31, in Claim 16, delete "N" and insert --An-- therefor

In Column 18, Line 40, in Claim 20, delete "He" and insert --The-- therefor

Signed and Sealed this
Twenty-seventh Day of February, 2024

*Katherine Kelly Vidal*

Katherine Kelly Vidal
*Director of the United States Patent and Trademark Office*